United States Patent [19]  
Nakagawa et al.

[11] 4,429,083  
[45] Jan. 31, 1984

[54] PROCESS FOR THE PRODUCTION OF POLYESTERPOLYCARBONATE

[75] Inventors: Takashi Nakagawa; Norio Ogata, both of Sodegaura, Japan

[73] Assignee: Idemitsu Kosan Company Limited, Tokyo, Japan

[21] Appl. No.: 417,875

[22] Filed: Sep. 14, 1982

[30] Foreign Application Priority Data

Oct. 5, 1981 [JP] Japan ................................ 56-157589
Oct. 5, 1981 [JP] Japan ................................ 56-157590

[51] Int. Cl.³ ............................................ C08G 63/64
[52] U.S. Cl. .................................... 525/439; 525/448; 528/125; 528/126; 528/128; 528/173; 528/176; 528/190; 528/191; 528/192; 528/193; 528/194
[58] Field of Search .............. 528/176, 190, 191, 192, 528/193, 194, 125, 126, 128, 173; 525/439, 448

[56] References Cited

U.S. PATENT DOCUMENTS

| 3,030,331 | 4/1962 | Goldberg | 528/176 |
| 4,107,143 | 8/1978 | Inata et al. | 528/176 |
| 4,278,787 | 7/1981 | Swart et al. | 528/191 |
| 4,350,805 | 9/1982 | Jackson, Jr. et al. | 528/176 |
| 4,355,150 | 10/1982 | Bosnyak et al. | 528/194 |
| 4,369,303 | 1/1983 | Mori et al. | 528/191 |

Primary Examiner—Lester L. Lee  
Attorney, Agent, or Firm—Frishauf, Holtz, Goodman & Woodward

[57] ABSTRACT

A process for the production of polyesterpolycarbonate is described, which comprises reacting an aqueous alkaline solution of dihydric phenol and an organic solvent solution of acid chloride to prepare polyester oligomer, mixing chloroformate group-containing polycarbonate oligomer with the polyester oligomer, and polycondensing the polyester oligomer and the polycarbonate oligomer to form the polyesterpolycarbonate.

9 Claims, No Drawings

PROCESS FOR THE PRODUCTION OF POLYESTERPOLYCARBONATE

BACKGROUND OF THE INVENTION

1. Field of the Invention

The present invention relates to a process for the production of polyesterpolycarbonate.

2. Description of the Prior Art

It is known that a copolymer of polycarbonate and polyester, i.e., polyesterpolycarbonate, has been developed for the purpose of improving heat-resistance, etc. of polycarbonate. Various methods have been proposed for the production of polyesterpolycarbonate, including (1) a solution method and (2) an interfacial polymerization method. In accordance with the solution method (1), bisphenol A and terephthalic acid chloride are reacted in pyridine and phosgene is introduced into the reaction mixture to perform polycondensation (see Japanese Patent Application Laid-Open No. 128992/1977). Since, however, this method uses pyridine, it is not commercially satisfactory in view of various problems, such as its recovery and unpleasant odor.

The interfacial method (2) has been developed as an improved process for the solution method (1), including (2-a) a three-stage polycondensation method in which an aqueous alkaline solution of dihydric phenols and an organic solvent solution of terephthalic acid chloride and isophthalic acid chloride are reacted to prepare polyester oligomers, phosgene is then reacted with the polyester oligomer, and furthermore, dihydric phenol is reacted therewith (see Japanese Patent Application Laid-Open Nos. 25427/1980 and 38824/1980) and (2-b) a method in which phosgene is added to polyester oligomer (see Japanese Patent Application Laid-Open Nos. 822/1981 and 823/1981). These methods (2-a) and (2-b), however, suffer from various disadvantages. For example, in the method (2-a), it is necessary to perform phosgenation of polyester oligomers, and the method (2-b) fails to produce polyesterpolycarbonate having a uniform composition (polycarbonate homopolymers are liable to be formed). The polycarbonate unit contained in polyesterpolycarbonate as produced by the above-described methods is one or a mixture composed mainly of one polycarbonate unit, and cannot be controlled appropriately or optionally. Furthermore, problems arise in combining the methods to conventional polycarbonate production steps.

SUMMARY OF THE INVENTION

An object of the invention is to provide a process for the production of polyesterpolycarbonate which produces polyesterpolycarbonate by utilizing an intermediate product-oligomer-from the existing polycarbonate production device, does not need an additional phosgenation step, and furthermore, which provides control of the molecular weight of the polycarbonate unit.

Another object of the invention is to provide a process for producing block-type polyesterpolycarbonate utilizing an intermediate product-oligomer-from the existing polycarbonate production device without the provision of an additional phosgenation step, in which the copolymer composition of the polyesterpolycarbonate can be controlled at will by appropriately chosing the amounts of both oligomers being compounded at the polycondensation (condensation polymerization) step.

The present invention, in one embodiment thereof, relates to a process for the production of polyesterpolycarbonate which comprises mixing an aqueous alkaline solution of dihydric phenol and an organic solvent solution of an acid chloride to prepare a polyester oligomer, adding a chloroformate group-containing polycarbonate oligomer to the polyester oligomer, and polycondensing the polyester oligomer and the polycarbonate oligomer.

In another embodiment, the present invention relates to a process for the production of polyesterpolycarbonate which comprises mixing an aqueous alkaline solution of dihydric phenol and an organic solvent solution of an acid chloride to prepare a terminal —Cl group-containing polyester oligomer, adding a chloroformate group-containing polycarbonate oligomer and an aqueous alkaline solution of dihydric phenol to the polyester oligomer, and polycondensing the polyester oligomer and the polycarbonate oligomer.

DETAILED DESCRIPTION OF THE INVENTION

Dihydric phenols which can be used include bis(hydroxyaryl)alkanes, such as 2,2-bis(4-hydroxyphenyl)propane (bisphenol A), bis(4-hydroxyphenyl)methane, 1,1-bis(4-hydroxyphenyl)ethane, 2,2-bis(4-hydroxy-3-methylphenyl)propane, 2,2-bis(4-hydroxyphenyl)butane, 4,4-bis(4-hydroxyphenyl)heptane, bis(4-hydroxyphenyl)phenylmethane, 2,2-bis(4-hydroxy-3-bromophenyl)propane, 2,2-bis(4-hydroxy-3,5-dichlorophenyl)propane, and 1,1-bis(4-hydroxy-3-tert-butylphenyl)propane; bis(hydroxyaryl)cycloalkanes, such as 1,1-bis(4-hydroxyphenyl)cyclohexane; dihydroxydiaryl ethers, such as bis(4-hydroxyphenyl)ether, and bis(3,5-dichloro-4-hydroxyphenyl)ether; dihydroxydiphenyls, such as 3,3'-dichloro-4,4'-dihydroxydiphenyl; dihydroxydiarylsulfides, such as 4,4'-dihydroxydiphenylsulfide; dihydroxydiarylsulfoxides, such as 4,4'-dihydroxydiphenylsulfoxide, and bis(3,5-dibromo-4-hydroxyphenyl)sulfoxide; and dihydroxydiarylsulfones, such as 4,4'-dihydroxydiphenylsulfone, and bis(3,5-dimethyl-4-hydroxyphenyl)sulfone.

Alkalis which can be used in preparing the aqueous alkaline solution of dihydric phenol include sodium hydroxide and potassium hydroxide. The concentration of dihydric phenol in the aqueous alkaline solution is not critical.

Acid chlorides as used herein are usually acyl dichlorides as prepared by exchanging both OH(s) of the two carboxyl groups of dibasic acids of Cl(s). In addition, acyl dichlorides derived from tribasic acids can be used. Organic acids which can be used to form the acid chlorides of the invention include saturated aliphatic dibasic acids derived from straight chain paraffin hydrocarbons, such as oxalic acid, malonic acid, dimethylmalonic acid, succinic acid, glutaric acid, adipic acid, pimelic acid, suberic acid, azelaic acid, and sebacic acid, and their halogen-substituted derivatives. In addition, aliphatic dibasic acids containing a hetero atom or atoms in the aliphatic chain, such as thioglycolic acid, and dithioglycolic acid; unsaturated dibasic acids, such as maleic acid, and fumalic acid; unsubstituted or substituted aromatic dicarboxylic acids, such as phthalic acid, isophthalic acid, terephthalic acid, homophthalic acid, o-phenylenediacetic acid, m-phenylenediacetic acid, and p-phenylenediacetic acid; and polycyclic aromatic dicarboxylic acids, such as diphenic acid, and 1,4-naphthalenedicarboxylic acid, can be used. Preferred examples of such acid chlorides are terephthalic acid chloride, isophthalic acid chloride, and the like, and they can be used in combination with each other. In this case, phthalic acid chloride, etc., containing a halogen atom or an alkyl group in the nucleus, are included.

Organic solvents which can be used in dissolving the above-described acid chlorides include chlorinated hydrocarbons, such as chloroform, trichloroethane, methylene chloride, and dichloroethylene. These solvents can be used in combination with organic solvents such as toluene, xylene, cyclohexane, dioxane, tetrahydrofuran, and acetone. The concentration of acid chloride in the organic solvent solution thereof is not critical and can be appropriately chosen within the range up to the saturated concentration.

Mixing an aqueous alkaline solution of dihydric phenol with an organic solvent solution of acid chloride results in the formation of polyester oligomer. This reaction can be represented by the following equation:

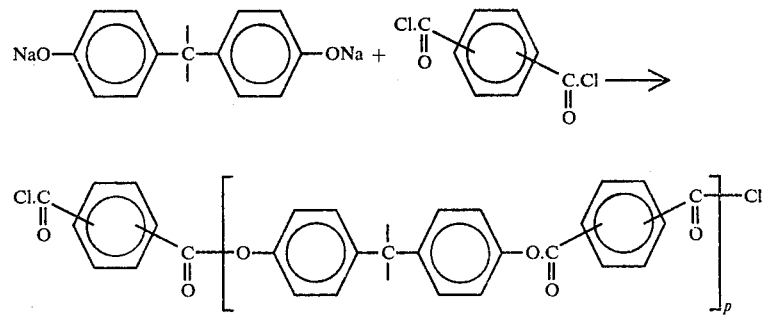

(wherein p is from 1 to 10).

In the above reaction, as can be seen from the equation, the acid chloride is always used in a manner that the molar ratio of acid chloride to dihydric phenol is from 1:0.5 to 1:0.75. This reaction falls within the second embodiment of the invention as described hereinbefore.

On the other hand, the formation of such polyester oligomer containing —Cl group at the terminals thereof is not needed in the first embodiment of the invention as described hereinbefore. In this case, it is preferred that an excess amount of dihydric phenol is used. Usually they are mixed so that the molar ratio of acid chloride to dihydric phenol is from 0.5:1 to 0.75:1.

This esterification reaction is completed in a relatively short period of time. Thus, it is performed usually at 5° to 40° C. for 0.05 to 60 minutes and preferably at 10° C. to 35° C. for 0.1 to 20 minutes. Long esterification reaction time may cause hydrolysis of the acid chloride and may form nonpreferable high molecular weight polyester oligomer. The esterification reaction time can be controlled by using a continuous flow reactor such as a packed column, an orifice tower, a stage tower, a tubular reactor, etc., and an instant mixer such as a pin-mixer. If desired, the esterification reaction may be performed in the presence of a suitable catalyst, such as triethylamine. In this way, polyester oligomers containing —OH groups at the terminals thereof are obtained.

Subsequently, chloroformate group-containing polycarbonate oligomers are added to a reaction mixture containing the above-described polyester oligomers, and the polycarbonate and polyester oligomers are subjected to polycondensation. The ratio of polyester oligomer to polycarbonate oligomer is chosen so that OH group/Cl group (in the polycondensation reaction system)=0.8 to 1.2. If desired, the polycondensation reaction may be performed in the presence of an aqueous alkaline solution of dihydric phenol as described hereinbefore. By further adding a suitable organic solvent, a monohydric phenol as a molecular weight-controlling agent, and a catalyst, such as triethylamine, the polycondensation reaction can be performed efficiently.

In the second embodiment of the invention as described hereinbefore, chloroformate group-containing polycarbonate oligomers and an aqueous alkaline solution of dihydric phenol are added to a reaction mixture containing the above-described polyester oligomer and, thereafter, the polyester oligomer and the polycarbonate oligomer are subjected to polycondensation. Also in this embodiment, the polycondensation reaction can be performed efficiently by adding a suitable organic solvent, a monohydric phenol as a molecular weight-controlling agent, and a catalyst, such as triethylamine.

In the process of the invention, the oligomer which is obtained as intermediate product at the usual existing polycarbonate production device can be used as the polycarbonate oligomer for use in the present polycondensation reaction. For such oligomer, the terminal chloroformate group content is usually at least 75%, and the remaining groups are —OH groups. As the aqueous alkaline solution of dihydric phenol, a suitable one is selected from the above-described solutions. The polycondensation reaction is performed at 0° to 40° C., preferably 10° to 35° C. for 15 to 180 minutes, preferably 50 to 150 minutes.

After the polycondensation reaction is completed, the reaction product is washed by passing through a washing step. The step comprises at least one washing step selected from water-washing, acid-washing, and alkali-washing, and preferably water-washing step is done as a final step.

The polyesterpolycarbonate as prepared by the first embodiment of the invention has a repeating unit represented by the following formula:

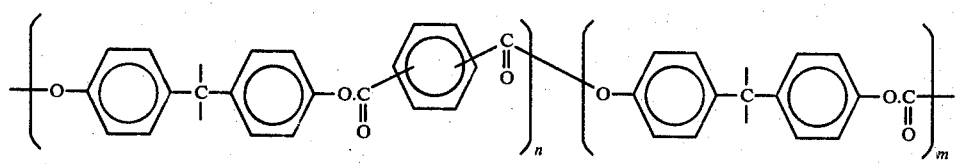

(wherein m is from 2 to 15 and n is from 1 to 10).

The polyesterpolycarbonate as prepared by the second embodiment of the invention has a repeating unit represented by the following formula:

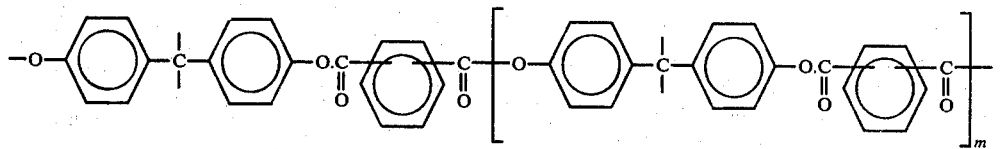
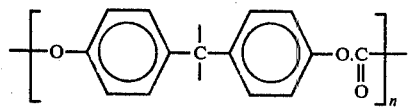

(wherein m is from 1 to 10, and n is from 1 to 10).

In accordance with the process of the invention, the desired polyesterpolycarbonate can be obtained by a relatively simple procedure. Furthermore, the polyester/polycarbonate ratio in the polyesterpolycarbonate can be adjusted as will at the second stage reaction. In addition, the process of the invention offers various advantages—for example, the number of repeating units for each block of the polyesterpolycarbonate is at least 2, and the length of each of the polycarbonate and polyester units can be adjusted appropriately or optionally. Moreover, an intermediate product obtainable during the production of polycarbonate can be utilized as a phosgenation step in the invention.

The polyesterpolycarbonate as obtained by the process of the invention has excellent thermal, mechanical, and chemical properties and, therefore, it is very useful as a material for use in the production of machines, electrical appliances, cars, etc.

The following examples are given to illustrate the invention in greater detail.

PREPARATION EXAMPLE

60 Kilograms of bisphenol A was dissolved in 400 liters of 5% caustic soda aqueous solution. Then, the aqueous caustic soda solution of bisphenol A and methylene chloride kept at room temperature were fed to a tubular reactor having an inner diameter of 10 millimeters and a tube length of 10 meters through an orifice plate at the flow rates of 138 liter per hour and 69 liter per hour respectively. Phosgene was fed thereto in a parallel-current flow at the flow rate of 8.0 kilograms per hour, and continuously subjected to reaction for 2 hours. The tubular reactor had a jacket, and cooling water was passed through the jacket part to keep the outlet temperature of the reaction liquid at 25° C. Thus, the pH of the effluent liquid came to be weakly alkaline. As a result, the reacted liquid was readily separated into two phases, i.e. the aqueous phase (253 liters) and the methylene chloride phase containing polycarbonate oligomer (146 liters) by settling. The oligomer thus obtained had a mean molecular weight of 700.

EXAMPLE 1

A solution of 15 grams (0.0658 mole) of bisphenol A dissolved in 100 milliliters of a 2 N aqueous sodium hydroxide solution and a solution of 4 grams (0.0197 mole) of terephthalic acid chloride and 4 grams (0.0197 mole) of isophthalic acid chloride dissolved in 250 milliliters of methyllene chloride were placed in a 1-liter reactor with a baffle provided therein and reacted while stirring at a rate of 400 revolutions per minute (r.p.m.).

After 5 minutes, stirring was stopped, and 110 milliliters of a methylene chloride solution of polycarbonate oligomer prepared by the above Preparation Example (containing 270 grams of said oligomer per liter of the methylene chloride solution; the molar ratio of hydroxyl group to chloroformate group in the reaction system is 1:1) and 0.15 gram of para-tert-butylphenol and 0.3 milliliter of an aqueous triethylamine solution (containing 0.5 mole of triethylamine per liter of the solution) were introduced into the reactor. They were then reacted at 25° C. for 50 minutes while stirring at a rate of 500 r.p.m.

After the reaction was completed, the reaction mixture was diluted with 1 liter of methylene chloride and, thereafter, 1.5 liters of water was added thereto and the resulting mixture was stirred. Subsequently, an aqueous layer was separated and removed, and an organic layer was washed with hydrochloric acid, water, an aqueous sodium hydroxide solution, and water in that sequence. The organic layer was then condensed and was subjected to re-precipitating purification using acetone to obtain polyesterpolycarbonate powder.

The reduced viscosity ($\eta_{sp}/c$) of the above-obtained polyesterpolycarbonate was 0.72 as determined at 20° C. in methylene chloride, and the glass transition temperature was 162° C. The ratio of residual bisphenol A radical to residual phthalic acid radical to carbonate bond in the polyesterpolycarbonate was 1:0.21:0.79. The glass transition temperature was measured by differential thermal analysis and the composition was measured by an infrared absorption spectrum analysis.

EXAMPLE 2

A solution of 15 grams (0.0658 mole) of bisphenol A dissolved in 100 milliliters of a 2 N aqueous sodium hydroxide solution, and a solution of 6 grams (0.0296 mole) of terephthalic acid chloride and 6 grams (0.0296 mole) of isophthalic acid chloride dissolved in 250 milliliters of methylene chloride were placed in a 1-liter reactor with a baffle provided therein. In addition, 0.3 milliliter of a 0.5 mole per liter of aqueous triethylamine solution was added thereto, and they were reacted while stirring at a rate of 400 r.p.m. at 25° C.

After 5 minutes, stirring was stopped, and 110 milliliters of a methylene chloride solution of terminal chloroformate group-containing polycarbonate oligomer prepared by Preparation Example (containing 270 grams of said oligomer per liter of the solution), a predetermined amount (to make the molar ratio of hydroxyl group to chloroformate group in the system 1:1) of solution of 4.2 grams of bisphenol A dissolved in 20 milliliters of a 2 N aqueous sodium hydroxide solution, 0.1 gram per liter of para-tert-butylphenol, and 0.3 milliliter of a 0.5 mole % aqueous triethylamine solution were added thereto. They were then reacted at 25° C., for 50 minutes while stirring at a rate of 500 r.p.m.

After the reaction was completed, the reaction mixture was diluted with 1 liter of methylene chloride, and 1.5 liters of water was then added thereto. The resulting mixture was stirred. Subsequently, an aqueous layer was separated and removed, and an organic layer was washed with hydrochloric acid, water, an aqueous sodium hydroxide solution, and water in that sequence. The organic layer was then condensed and was subjected to re-precipitating purification using acetone to obtain polyesterpolycarbonate powder.

The reduced viscosity ($\eta_{sp}/c$) of the polyesterpolycarbonate was 0.70 as determined at 20° C. in methylene chloride, and the glass transition temperature was 168° C. The ratio of residual bisphenol A radical to residual phthalic acid radical to carbonate bond is 1:0.30:0.70.

EXAMPLE 3

A solution of 150 grams (0.658 mole) of bisphenol A dissolved in 1000 milliliters of a 2 N aqueous sodium hydroxide solution and a solution of 40 grams (0.197 mole) of terephthalic acid chloride and 40 grams (0.197 mole) of isophthalic acid chloride dissolved in 2000 milliliters of methylene chloride were prepared.

The sodium hydroxide solution of bisphenol A and the methylene chloride solution of the phthalic chloride were supplied respectively at the flow rate of 50 milliliters per minute and 75 milliliters per minute into a tubular reactor having an inner diameter of 6 millimeters and longitudinal length of 1 meter, and the reaction between bisphenol A and the phthalic chloride was performed at 25° C.

600 Milliliters of the reaction mixture, 100 milliliters of a methylene chloride solution (200 grams per liter) of chlorofomate group-containing polycarbonate oligomer (mean molecular weight 700), 0.15 grams of para-tert-butylphenol and 1 milliliter of an aqueous triethylamine solution (contains 0.5 moles of said amine per liter) were placed in a 1-liter reactor with a baffle and then reacted at 25° C. for 50 minutes while stirring at a rate of 500 r.p.m.

After the reaction was completed, the reaction mixture was washed and purified as the same manner as described in Example 1. The reduced viscosity ($\eta_{sp}/C$) of the obtained polyesterpolycarbonate was 0.73 as determined at 20° C. in methylene chloride, and the glass transition temperature was 170° C. The ratio of residual bisphenol A radical to residual phthalic acid radical to carbonate bond in the polyesterpolycarbonate was 1:0.45:0.55.

EXAMPLE 4

A solution of 16.4 grams (0.072 mole) of bisphenol A dissolved in 120 milliliters of a 2 N aqueous sodium hydroxide solution, and a solution of 8.12 grams (0.04 mole) of terephthalic acid chloride and 8.12 grams (0.04 mole) of isophthalic acid chloride dissolved in 300 milliliters of methylene chloride were placed in a 1-liter reactor with a baffle provided therein. In addition, 0.4 milliliter of an aqueous triethylamine solution (contains 0.5 mole of triethylamine per liter of the solution) was added thereto, and they are reacted at 25° C. while stirring at a rate of 500 r.p.m.

After 5 minutes, stirring was stopped, and 100 milliliters of a methylene chloride solution of terminal chloroformate group-containing polycarbonate oligomer prepared by Preparation Example (contains 330 grams of said oligomer per liter of the solution), 0.05 gram of para-tert-butylphenol, and 7.5 milliliters of an 18.8 N aqueous sodium hydroxide solution were added. The resulting mixture was then stirred at a rate of 500 r.p.m. Subsequently, after 5 minutes, a solution of 7.2 grams of bisphenol A dissolved in 50 milliliters of a 2 N aqueous sodium hydroxide solution and 0.4 milliliter of an aqueous triethylamine solution (contains 0.5 mole of triethylamine per liter of the solution) were added, and they were reacting at 25° C. for 50 minutes while stirring.

After the reaction was completed, the reaction mixture was diluted with 1 liter of methylene chloride, and 1.5 liters of water was added thereto. The mixture was then stirred for 20 minutes and an aqueous layer was separated and removed. An organic layer was washed with an aqueous hydrochloric acid solution, condensed, and was subjected to re-precipitating purification using acetone to obtain polyesterpolycarbonate powder.

The reduced viscosity ($\eta_{sp}/C$) of the above-obtained polyesterpolycarbonate was 0.85 (as determined at 20° C. in methylene chloride), and the glass transition temperature was 165° C. The ratio of residual bisphenol A radical to residual phthalic acid radical to carbonate bond in the polyesterpolycarbonate was 1:0.39:0.61. The glass transition temperature was measured by differential thermal analysis, and the composition was measured by infrared absorption spectrum analysis.

EXAMPLE 5

A solution of 5.4 grams (0.024 mole) of bisphenol A dissolved in 100 milliliters of a 2 N aqueous sodium hydroxide solution, and a solution of 4.0 grams (0.02 mole) of terephthalic acid chloride and 4.0 grams (0.02 mole) of isophthalic acid chloride dissolved in 250 milliliters of methylene chloride were placed in a 1-liter reactor with a baffle provided therein. In addition, 0.4 milliliter of a 0.5 mole per liter aqueous triethylamine solution was added, and they were reacted at 25° C. while stirring at a rate of 500 r.p.m.

After 10 minutes, stirring was stopped, and 32.9 milliliters of a methylene chloride solution of terminal chloroformate group-containing polycarbonate oligomer prepared by Preparation Example (contains 330 grams of said oligomer per liter of said solution) was introduced into the reactor. The mixture was stirred at a rate of 500 r.p.m. at 25° C. Subsequently, after 5 minutes, a solution of 6.0 grams of bisphenol A dissolved in 50 milliliters of a 2 N aqueous sodium hydroxide solution and 0.4 milliliter of a 0.5 mole per liter of aqueous triethylamine solution were added, and they were reacted for 50 minutes while stirring.

After the reaction was completed, the reaction mixture was diluted with 1 liter of methylene chloride, and 1.5 liters of water was added thereto. The resulting mixture was then stirred for 20 minutes and, thereafter, an aqueous layer was separated and removed. An organic layer was washed with an aqueous hydrochloric acid solution, condensed, and was subjected to reprecipitating purification using acetone to obtain polyesterpolycarbonate.

The reduced viscosity ($\eta_{sp}/C$) of the above-obtained polyesterpolycarbonate was 0.91 (as determined at 20° C. in methylene chloride), and the glass transition temperature was 169° C. The ratio of residual bisphenol A radical to residual phthalic acid radical to carbonate bond in the polyesterpolycarbonate was 1:0.55:0.45.

What is claimed is:

1. A process for producing polyesterpolycarbonate which comprises reacting an aqueous alkaline solution of dihydric phenol and an organic solvent solution of acid chloride, the molar ratio of the dihydric phenol to the acid chloride being from 1:0.5 to 1:0.75, at a temperature of from 5° to 40° C. for 0.05 to 60 minutes to prepare a polyester oligomer containing terminal hydroxyl group, mixing a chloroformate group-containing polycarbonate oligomer with said polyester oligomer, and polycondensing the polyester oligomer and the polycarbonate oligomer at a temperature of from 0° to 40° C. for 15 to 180 minutes.

2. The process of claim 1, wherein the polyester oligomer and the polycarbonate oligomer are mixed so that the ratio of —OH group to —Cl group in the polycondensation reaction system is within the range of from 0.8:1 to 1.2:1.

3. The process of claim 1, wherein the polycondensation reaction between the polyester oligomer and the polycarbonate oligomer is performed in the presence of an aqueous alkaline solution of dihydric phenol.

4. The process of claim 1, wherein the polycarbonate oligomer has a terminal chloroformate group content of at least 75%, with the remaining group being hydroxyl group.

5. The process of claim 1, wherein the polyester oligomer and the polycarbonate oligomer are mixed so that the ratio of —OH group to —Cl group in the polycondensation reaction system is within the range of from 0.8:1 to 1.2:1; the polycondensation reaction between the polyester oligomer and the polycarbonate oligomer is performed in the presence of an aqueous alkaline solution of dihydric phenol; and the polycarbonate oligomer has a terminal chloroformate group content of at least 75%, with the remaining group being hydroxyl group.

6. A process for producing polyesterpolycarbonate which comprises reacting an aqueous alkaline solution of dihydric phenol and an organic solvent solution of acid chloride, the molar ratio of the dihydric phenol to the acid chloride being from 0.5:1 to 0.75:1, at a temperature of from 5° to 40° C. for 0.05 to 60 minutes to prepare a polyester oligomer containing terminal —Cl groups, mixing a chloroformate group-containing polycarbonate oligomer and an aqueous alkaline solution of dihydric phenol, and polycondensing the polyester oligomer and the polycarbonate oligomer at a temperature of from 0° to 40° C. for 15 to 180 minutes.

7. The process of claim 6, wherein the polyester oligomer and the polycarobnate oligomer are mixed so that the ratio of —OH group to —Cl group in the polycondensation reaction system is within the range of from 0.8:1 to 1.2:1.

8. The process of claim 6, wherein the polycarbonate oligomer has a terminal chloroformate group content of at least 75%, with the remaining group being hydroxyl group.

9. The process of claim 6, wherein the polyester oligomer and the polycarbonate oligomer are mixed so that the ratio of —OH group to —Cl group in the polycondensation reaction system is within the range of from 0.8:1 to 1.2:1; and the polycarbonate oligomer has a terminal chloroformate group content of at least 75%, with the remaining group being hydroxyl group.

* * * * *